United States Patent

[11] 3,556,474

| [72] | Inventor | Domer Scaramucci<br>3245 S. Hattie, Oklahoma City, Okla. 73129 |
|---|---|---|
| [21] | Appl. No. | 753,653 |
| [22] | Filed | Aug. 19, 1968 |
| [45] | Patented | Jan. 19, 1971 |

[54] DUAL SEALED BALL VALVES
20 Claims, 9 Drawing Figs.

[52] U.S. Cl. ................................................. 251/172, 251/315
[51] Int. Cl. .................................................. F16k 5/06
[50] Field of Search ............................................ 137/246, 516.25, 539, 539.5; 251/160, 171, 172, 174, 175, 180, 181, 314—317, 364

[56] References Cited
UNITED STATES PATENTS

| 2,516,947 | 8/1950 | Blevans | 251/315 |
|---|---|---|---|
| 3,050,077 | 8/1962 | Wheatley | 251/328X |
| 3,215,157 | 11/1965 | Anderson et al. | 137/246 |
| 3,323,542 | 6/1967 | Magos et al. | 251/315X |
| 3,357,679 | 12/1967 | Gulick | 251/317X |
| 3,460,802 | 8/1969 | Colby et al. | 251/315X |
| 3,462,120 | 8/1969 | Priese | 251/315 |

*Primary Examiner*—Robert G. Nilson
*Attorney*—Dunlap, Laney and Hessin

ABSTRACT: An improved valve, having a seat assembly provided with dual seals, which may be used in the upstream and downstream position. In the downstream position, one seal is a pressure-responsive-type seal and is exposed to pressure in the valve chamber, and the other seal is a secondary compression-type seal. In the upstream position, one seal is a pressure-responsive-type seal and is exposed to pressure in the inlet of the valve, and the other seal is a secondary compression-type seal. The seat structure is so designed to protect the seals from being damaged when the valve member contacts the seat assembly, and is capable of relieving excessive body pressure in the valve chamber.

INVENTOR.
DOMER SCARAMUCCI

INVENTOR.
DOMER SCARAMUCCI 3,556,474

DUAL SEALED BALL VALVES

BACKGROUND OF THE INVENTION

1. Field of the Invention

This invention relates generally to improvements in valves, and more particularly, but not by way of limitation, to an improved seat assembly for a valve.

2. Description of the Prior Art

In the past there have been seat assemblies designed using pressure responsive type seals and, of course, there have been seat assemblies using compression-type seals. Since the function of a seat assembly in the upstream end of a valve differs from the function of a seat assembly in the downstream position, the problem, which has existed, has been to combine the most useful features of these two types of sealing methods into a single seat assembly, which will function effectively at the upstream and downstream ends of a valve. This problem was aggravated by the considerations that the seat assembly should also be capable of relieving excessive body pressure, which builds up in the valve chamber, and should be designed to protect the seal members from being pinched off or otherwise damaged when the valve member engaged the seat assembly. The design of this particular type of seat assembly has been extremely difficult to accomplish in an economical manner.

SUMMARY OF THE INVENTION

The present invention contemplates a valve comprising a body having an inlet opening, a valve chamber, and an outlet opening therein forming a flow passageway therethrough. A valve member is supported in the valve chamber for opening and closing the flow passageway through the valve. A seat assembly is disposed in the valve chamber around one of said openings cooperating with the adjacent walls of the valve chamber and the valve member to close the flow passageway through the valve body. The seat assembly comprises a ring of relatively inflexible material having a valve-seating surface formed between the inner and outer peripheries thereof; an inner seal means disposed in the valve-seating surface, having a portion thereof extending beyond said seating surface and exposed to the pressure in the valve chamber; and an outer seal means disposed in the valve-seating surface having a portion thereof extending beyond said seating surface and exposed to the pressure in the opening forming a part of the flow passageway.

An object of the invention is to provide a seat assembly which can be used in both the upstream and downstream ends of a valve.

Another object of the invention is to provide a seat assembly with dual seals, one seal being pressure responsive, and the other seal being a secondary compression-type seal.

A further object of the invention is to provide a downstream seat assembly which will support the valve member and yet prevent damage to the sealing material employed in the seat assembly.

A still further object of the invention is to provide an upstream and downstream seat assembly which will effectively perform the sealing function and yet is capable of relieving excess body pressure.

Another object of the invention is to provide a seat assembly capable of providing a fluidtight seal between the seat assembly and the valve member; and between the seat assembly and the valve body.

Another object of the invention is to provide a valve and seat assembly economical in construction and operation.

Other objects and advantages of the invention will be evident from the following detailed description when read in conjunction with the accompanying drawings which illustrate various embodiments of the invention.

DESCRIPTION OF THE PREFERRED EMBODIMENTS

Figure 1:
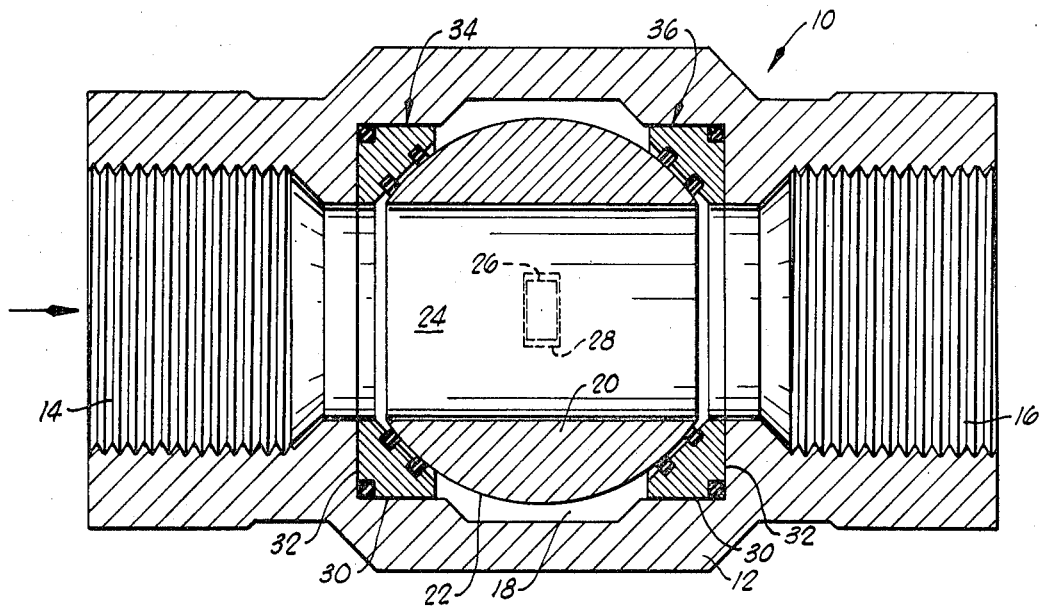
FIG. 1 is a sectional view through a valve looking up toward the valve stem.

Referring to the drawings in detail, and particularly FIG. 1, reference character 10 generally designates a complete valve which includes a body 12 having an inlet 14 and an outlet 16 communicating with the opposite ends of a valve chamber 18. It will be readily understood by those skilled in the art that the inlet 14 and outlet 16 may be of any desired construction, such as flanged members, rather than being internally threaded as illustrated in FIG. 1. A valve member in the form of a ball 20 having an exterior surface 22 thereon, and a port 24 extending therethrough, is positioned in the valve chamber 18 for opening and closing the valve upon turning movement thereof in the usual fashion.

The ball 20 is turned by means of a stem 26 which will project out of the top (not shown) of the valve body 12. As shown in dashed lines in FIG. 1, the valve stem 26 is of rectangular cross section to mate with a slot 28 in the top of the valve ball 20, such that the ball 20 will be turned upon turning of the valve stem 26, yet the ball 20 is free to move upstream and downstream when in a closed position with the port 24 turned at right angles to the inlet 14 and outlet 16. Thus, the valve ball 20 is of the type known in the art as a "floating" valve member or ball.

Each end of the valve chamber 18 is provided with a concentric counterbore 30 forming a cylindrical wall in alignment with the respective inlet or outlet of the valve. The counterbore 30 provides an annular shoulder 32 extending normal to the axis of the respective inlet or outlet and facing the interior of the valve chamber 18. The counterbores 30 are provided to receive and cooperate with upstream and downstream seat assemblies generally designated by reference characters 34 and 36, respectively. In a preferred form, the seat assemblies 34 and 36 are of the same construction, so it will be necessary only to describe one of such seat assemblies in detail.

Figures 2, 3:
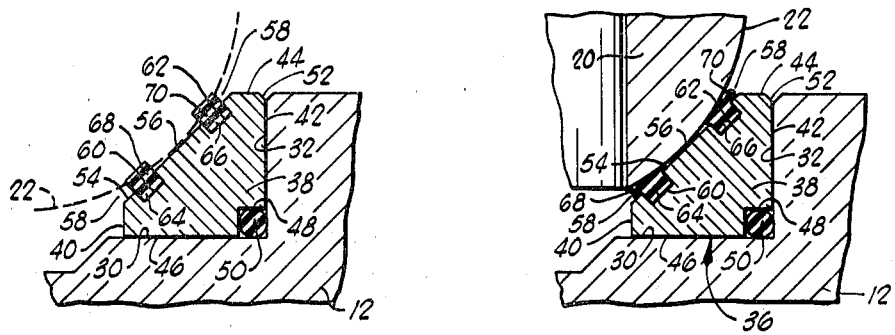
FIG. 2 is an enlarged typical cross-sectional view through a seal assembly used in the valve of FIG. 1.
FIG. 3 is a view similar to FIG. 2 illustrating the operation of the seat assembly at the downstream end of a valve.

A preferred seat assembly construction is illustrated in its relaxed condition in FIG. 2 and basically comprises a ring 38 having a valve member end 40, a nonvalve member end 42, an inner periphery 44 and an outer periphery 46. The ring 38 is formed of a relatively inflexible material, such as metal or one of the fluorocarbon plastic materials, such as nylon or Teflon, to function as a bearing for supporting the valve member 20 at the downstream end of the valve 10, as will be set forth more fully below.

The outer periphery 46 of ring 38 is of a size to provide a sliding fit thereof in the counterbore 30 at the respective end of the valve 10 in which the assembly is to be used. The nonvalve member end 42 of ring 38 is shaped normal to the axis of ring 38 to abut annular shoulder 32 of counterbore 30, thereby limiting the movement of the seat assembly for reasons which will become more apparent hereinafter.

An annular groove 48 is formed between the nonvalve member end 42 of ring 38 and the outer periphery 46 of ring 38. An annular seal member or O-ring 50 is disposed in the groove 48 of ring 38 and is provided to maintain sealing contact with the valve body 12 of valve 10 as will be described more fully hereinafter.

Preferably, a chamber 52 is formed on the nonvalve member end 42 adjacent the inner periphery 44 of ring 38 to minimize the necessity for close machining between the ring 38 and the adjacent shoulder 32 of valve body 12.

A seating surface 54 is formed on the valve member end 40 of ring 38. In a preferred form shown in the cross-sectional view of FIG. 2, the surface 54 of ring 38 is basically flat and is provided to be relatively tangent to the exterior surface 22 of the valve member 20, at least at the central portion 56 of surface 54. As an example, the seating surface may extend at about 45° with respect to the centerline through its valve. It may be observed that when the exterior surface 22 of valve member 20 is seated against the surface 54, that is, in contact with the surface 54 at portion 56, there is a space 58 which exists between the exterior surface 22 of valve member 20 and the surface 54 near the inner and outer edge of the surface 54. The reason the spaces 58 are provided will be explained more fully hereinafter.

A pair of annular grooves 60 and 62 are formed in the surface 54 of ring 38. The grooves 60 and 62 are located on the surface 54 of ring 38 to be on opposite sides of the tangent portion 56 of surface 54. Inner and outer seal members 64 and 66, respectively, such as natural or synthetic rubber, are bonded in the grooves 60 and 62 respectively. The seal members 64 and 66 are provided with portions 68 and 70 respectively, which extend sufficiently beyond the surface 54 of ring 38 to sealingly engage the exterior surface 22 of valve member 20. As shown in FIG. 2, each of the inner and outer seal members 64 and 66 have a generally rectangular cross section. It is also apparent from FIG. 2 that the diameter of seal member 64 is less than the diameter of O-ring 50.

OPERATION OF EMBODIMENT OF FIGURES 1 AND 2

When the valve ball 20 is centered in the valve chamber 18, as when the valve 10 is open as shown in FIG. 1, the protruding portions 68 and 70 of inner and outer seal members 64 and 66, respectively, are partially deformed by the exterior surface 22 of valve member 20.

When the valve ball 20 is turned to a closed position by the stem 24, the valve ball 20 is free to move downstream with respect to the stem 24, in the event a differential pressure is applied across the valve. Assuming that a higher pressure does exist at the inlet 14 of the valve 10, the valve ball 20 (see FIG. 3) will be moved downstream and, in turn, move downstream seat 36 downstream. The downstream seat assembly 36, and the valve ball 20 will continue moving downstream until the nonvalve member end 42 of ring 38 engages annular shoulder 32 in the valve body 12. In this closed position, shown in FIG. 3, the valve ball 20 will be supported by the ring 38 of downstream seat assembly 36 by the portion 56 thereof, which essentially forms an annular bearing surface for the valve ball 20. As clearly shown in FIG. 3, the protruding portions 68 and 70 of the seal members 64 and 66, respectively, are deformed generally between the exterior surface 22 of valve member 20 and the surface 54 of ring 38 and in a direction generally away from the bearing surface formed by the portion to extend into the spaces 58.

It is apparent that the deformed portion 68 of inner seal member 64 is exposed to pressure existing in the valve chamber 18. The inner seal member 64 of downstream seat assembly 36 forms, therefore, a pressure-responsive-type seal, that is, the pressure existing in the valve chamber 18 will augment the sealing effectiveness of inner seal member 64 between the ring 38 and the exterior surface 22 of valve ball 20. The deformed portion 70 of outer seal member 66 which is of course, compressed by the valve ball 20, forms essentially a compression-type seal and provides a secondary sealing means with respect to the inner seal member 64 of the downstream seat assembly 36.

The reason that the surface 54 of ring 38 is substantially flat is that when the valve ball 20 is seated against the ring 38 of downstream seat assembly 36, the spaces 58 will exist between the surface 54 of ring 36 and the exterior surface 22 of valve ball 20 at the inner and outer edges of the ring 36 and provide a space to accommodate the deformed portions 68 and 70 of inner and outer seal members 64 and 66, respectively. Since the bearing or seating surface is at the central portion 56 of surface 54, the protruding portions 68 and 70 of inner and outer seal members 64 and 66 will be deformed generally in a direction away from said portion 56 and into the spaces 58, thereby preventing the destruction, or pinching off of said protruding portions 68 and 70 when the valve member 20 is in the closed position as shown in FIG. 3.

It should be noted that the O-ring seals 50 of the upstream seat assembly 34 and the downstream seat assembly 36, provide fluidtight seals between the ring 38 of the respective seat assemblies 34 and 36 and the valve body 12 of valve 10.

Figure 4:
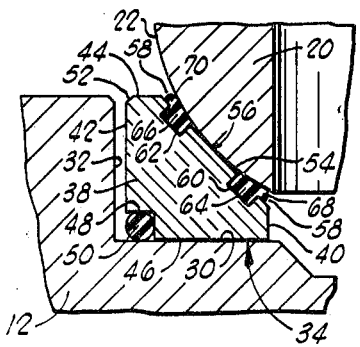
FIG. 4 is a view similar to FIG. 3, but illustrating the operation of the seat assembly at the upstream end of a valve.

When the valve ball 20 moves downstream, it will move away from the surface 54 of ring 38 at the upstream end of the valve 10 as shown in FIG. 4. However, the upstream pressure in the inlet end 14 of valve 10 will gain access to the space between the nonvalve member end 42 of ring 38 and the annular shoulder 32 of valve body 12, to force the ring 38 of upstream seat assembly 34 downstream with the valve ball 20. The upstream seat assembly 34 will come to rest in the position shown in FIG. 4.

The upstream seat assembly 34 will function in a manner generally similar to that previously described for the downstream seat assembly 36, although the upstream seat assembly 34 will not function to provide a bearing surface for the valve ball 20. The surface 54 of the upstream seat assembly 34 will contact the exterior surface 22 of valve member 20 at the tangent portion 56 thereof. The protruding portions 68 and 70 of inner and outer seal members 64 and 65 will, therefore, be deformed to some extent into the spaces 58 exactly like that described for the downstream seat assembly 36.

The main difference to be noted in the operation of the upstream and downstream seat assemblies 34 and 36, respectively, is that the outer seal member 66 of upstream seat assembly 36 is, or rather functions as, a pressure-responsive-type seal. That is, the pressure existing in the inlet 14 of valve 12 will augment the sealing effectiveness of seal member 66 between the ring 38 of upstream seat assembly 34 and the exterior surface 22 of valve member 20. The outer seal member 64 of upstream seat assembly 34 then functions as a compression-type seal and provides a secondary seal means with respect to the inner seal member 66 of upstream seat assembly 34.

Finally, it should be pointed out that, since the effective sealing area encompassed by outer seal member 64 is less that the effective sealing area encompassed by O-ring 50 of ring 38, excessive body pressure, as may be created by thermal conditions, for example, can be dissipated or relieved by forcing the upstream seat assembly 34 away from the valve ball 20 and allowing a momentary flow between the valve ball 20 and the surface 54 of the upstream seat assembly 34.

EMBODIMENT OF FIGURE 5

Figures 5, 6:
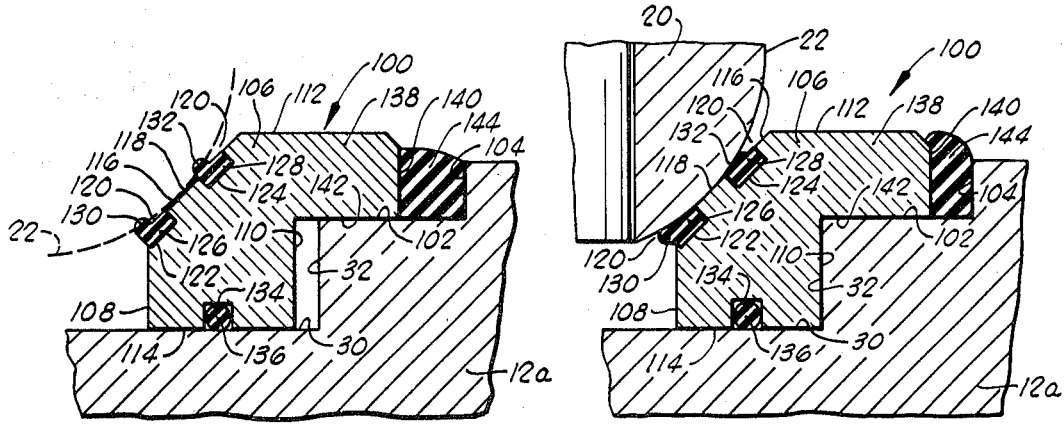
FIG. 5 is a view similar to FIG. 2 of a modified seat assembly.
FIG. 6 is a view similar to FIG. 5 illustrating the operation of the seat assembly at the downstream end of a valve.

Another embodiment of a seat assembly, which may be used at both the upstream and downstream ends of the valve 10, is shown in FIG. 5 and is constructed in accordance with the invention. In FIG. 5, the seat assembly is designated by the general reference character 100.

To accommodate the seat assembly 100, it is necessary to modify the valve body 12a of valve 10 by forming an additional counterbore 102, thereby providing the additional shoulder 104. It is to be understood that, with the exception of the herebefore mentioned modification, the valve body 12a is constructed exactly like the valve body 12 in FIG. 1; therefore, only that portion of the valve body 12a necessary to describe the modification is shown in FIG. 5.

The seat assembly 100 comprises a ring 106, having a valve member end 108, a nonvalve member end 110, and inner and outer peripheries 112 and 114, respectively.

A seating surface 116 is formed on the valve member end 108 of ring 106 and is constructed similar to surface 54 of ring 38, having a generally planar cross section as shown in FIG. 5. The surface 116 is provided to be relatively tangent to the exterior surface 22 of valve member 20 at the central portion 118 thereof. It may be observed in FIG. 5, when the exterior surface 22 of valve member 20 is seated against the surface 116 of ring 106, that is, in contact with the surface 116 at portion 118, spaces 120 exist between the exterior surface 22 of valve member 20 and surface 116 on both sides of portion 118.

A pair of annular grooves 122 and 124 are formed in the surface 116 of ring 106. The grooves 122 and 124 are located in the surface 116 of ring 106, to be on opposite sides of the portion 118. Inner and outer seal members 126 and 128, such as natural or synthetic rubber, are bonded in the grooves 122 and 124, respectively.

Annular beads 130 and 132 are formed on the inner ends of inner and outer seal member 126 and 128, respectively, and extend sufficiently beyond the surface 116 of ring 106 to sealingly engage the exterior surface 22 of valve member 20.

The outer periphery 114 of ring 106 is of a size to provide a sliding fit thereof in the counterbore 30 at the respective end of the valve 10 in which the assembly is to be used. An annular groove 134 is formed in the outer periphery 114 of ring 106, and an O-ring 136 is disposed in said groove 134 to provide a seal between the ring 106 of seat assembly 100 and the valve body 12a. The nonvalve member end 110 of ring 106 is shaped normal to the axis of ring 106 to abut annular shoulder 32 of counterbore 30, thereby limiting the movement of the seat assembly 100 for reasons which will become more apparent hereinafter.

An axially extending flange portion 138 is formed on the nonvalve member end 110 of ring 106, having a nonvalve member end 140. The outer periphery 142 of flange portion 138 is sized to provide a sliding fit in counterbore 102 of valve body 12a. An elastomer pad 144, such as natural or synthetic rubber, is bonded to the nonvalve member 140 of flange portion 138 and is sized to sealingly contact the valve body 12a of valve 10 in a manner which will be described more fully hereinafter.

OPERATION OF EMBODIMENT OF FIGURE 5

When the valve member 20 of valve 10 is turned to the closed position, a pressure differential will exist across the valve member 20, causing the valve member 20 to move downstream, in a manner as previously described.

In the downstream position, the seat assembly 100 will function similar to the downstream seat assembly 36 shown in FIGS. 1 and 3. The exterior surface 22 of valve member 20 will engage surface 116 of ring 106 and move the seat assembly 100 downstream until the nonvalve member 110 of ring 106 abuts the shoulder 32 of counterbore 30. The seat assembly 100 will then come to rest in the position shown in FIG. 6, and the valve ball 20 will be supported by the ring 106 of seat assembly 100 at the central portion 56 thereof, which essentially forms an annular bearing surface for the valve ball 20.

As clearly shown in FIG. 6, the annular beads 130 and 132 of inner and outer seal members 126 and 128, respectively, are deformed generally between the exterior surface 22 of valve member 20 and the surface 116 of ring 106 and in a direction generally away from the bearing surface formed by the portion 118 into the spaces 120.

The deformed annular bead 130 of inner seal member 126 is exposed to pressure existing in the valve chamber 18 and forms a pressure-responsive-type seal similar to the inner seal 64 of downstream seat assembly 36. The deformed annular bead 132 of outer seal member 128 is compressed by the valve ball 20 and forms, essentially, a compression-type seal similar to outer seal member 66 of downstream seat assembly 36. The inner seal member 126, therefore, functions as the primary sealing means, and the outer seal member 128 functions as the secondary sealing means when the seat assembly 100 is utilized in the downstream position. In this position, the seal members 126 and 128 are protected by spaces 120 in a manner similar to that described for downstream seat assembly 36 shown in FIGS. 1 and 3.

In the closed position, shown in FIG. 6, the elastomer pad 144 of the downstream seat assembly 100 is relatively inactive with respect to functioning as a seal means. The O-ring 136 provides a fluid tight seal between the ring 106 and the valve body 12a.

Since the effective sealing area formed by the outer seal member 128 is less than the effective sealing area formed by the elastomer pad 144, the seat assembly 100, when utilized in the upstream position, will follow the movement of the valve member 20 in the downstream direction, in a manner exactly like that described for upstream seat assembly 34 of valve 10, shown in FIGS. 1 and 4. The seat assembly 100, in the upstream position, will then come to rest in the position shown in FIG. 7.

Figures 7, 8:
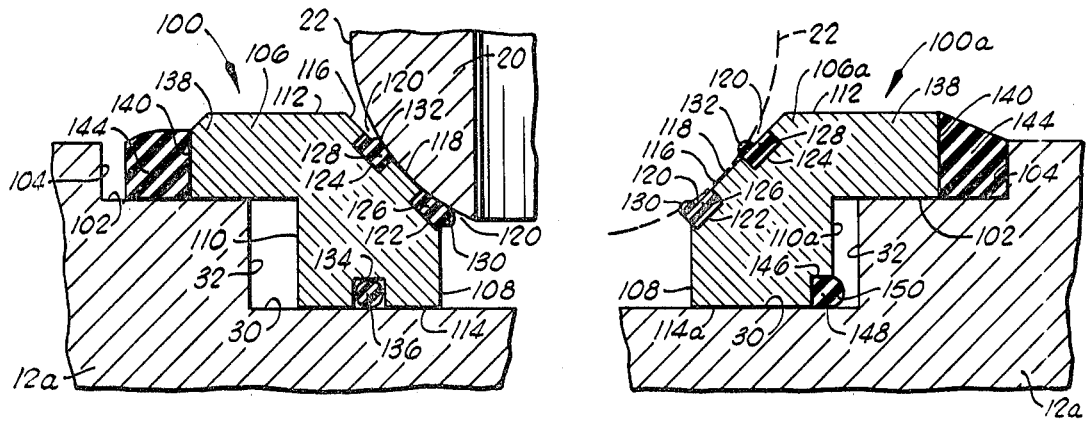
FIG. 7 is a view similar to FIG. 6, but illustrating the operation of the seat assembly at the upstream end of a valve.
FIG. 8 is a view similar to FIG. 5 illustrating another modified seat assembly.

In the position shown in FIG. 7, the seat assembly 100 will not function to provide a bearing surface for the valve ball 20. However, the surface 116 of seat assembly 100 will contact the exterior surface 22 of valve member 20 at the portion 118 thereof. The annular beads 130 and 132 of inner and outer seal members 126 and 128, respectively, will, therefore, be deformed to some extent into the spaces 120 in a manner similar to that described herebefore with respect to seat assembly 100 in the downstream position. The outer seal member 128 functions as a pressure-responsive-type seal, in a manner exactly like outer seal member 66 of upstream seat assembly 36 shown in FIGS. 1 and 4. The inner seal member 126 will function as a compression-type seal, or rather as a secondary seal means exactly like inner seal member 66 of upstream seat assembly 34.

The pressure existing in the inlet 14 of valve 10 will act upon the elastomer pad 144 of the upstream seat, and the pad 144 will, therefore, form a fluidtight seal between the ring 106 and the valve body 12a. The O-ring 136 will remain relatively inactive, since the primary sealing function is provided by the elastomer pad 144, as previously described.

Since the effective sealing area formed by O-ring 136 is greater that the effective sealing area formed by the inner seal member 126 of ring 106, excessive body pressure in the valve chamber 18 will cause the seat assembly 100 in the upstream position, shown in FIG. 7, to move upstream away from the valve ball 20 and thereby relieve the body pressure in a manner exactly like that described for upstream seat assembly 34 in FIG. 4.

EMBODIMENT OF FIGURE 8

The modified seat assembly 100a shown in FIG. 8 is only a slight variation of the seat assembly 100 shown in FIG. 5. In the seat assembly 100a, the ring 106a is provided with an annular groove 146 which is formed between the nonvalve member end 110a of ring 106a and the outer periphery 114a of ring 106a. An annular seal member 148, having a portion 150, which protrudes beyond the nonvalve member end 110a of ring 106a, is bonded in the groove 146 of ring 106a. In all other aspects, the seat assembly 100a is constructed identical to the seat assembly 100, shown in FIG. 5.

Due to the similarity in construction, it may be appreciated that the seat assembly 100 and the seat assembly 100a will operate in substantially an identical manner, except as hereinafter described.

The protruding portion 150 of seal member 148 will be compressed against annular shoulder 32 of counterbore 30 when the seat assembly 100a is utilized in the downstream position. In this position, the seal member 148 of seat assembly 100a will, therefore, function effectively to prevent downstream bypass or leakage. It may be observed in FIG. 8, that the seal member 148 is not retained or captured in position by groove 146 of ring 106a, and that the diameter of inner seal member 126 of ring 106a is greater than the diameter of elastomer pad 144 of seat assembly 100a. The excessive body pressure, which may build up in the valve chamber 18 of valve 10, will, therefore tend to relieve around the outer periphery 114a of ring 106a.

EMBODIMENT OF FIGURE 9

Figure 9:
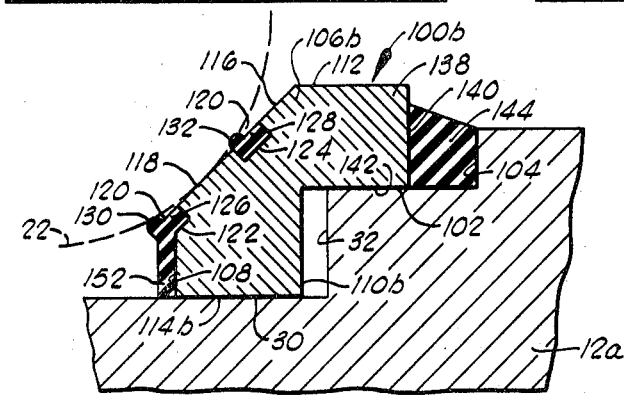
FIG. 9 is still another view similar to FIG. 5 of still another modified seat assembly.

Another modified seat assembly 100b, which may be used at both the upstream and downstream ends of valve 10, is illustrated in a relaxed condition, in FIG. 9, and is, of course, constructed in accordance with the invention. The seat assembly 100b having modified ring 106b, is constructed exactly like seat assembly 100, except as hereinafter described.

The seat assembly 100b is not provided with a groove in the outer periphery 114b thereof, nor with an O-ring seal similar to groove 134 and O-ring seal 136 of seat assembly 100, as shown in FIG. 5, for reasons which will become more apparent hereinafter.

As clearly shown in FIG. 9, an elastomer seal member 152 is bonded to the valve member end 108 of ring 106b. The seal member 152, such as natural or synthetic rubber, is sized to be in sealing contact with the valve body 12a of valve 10.

The seat assembly 100b will operate exactly like the seat assembly 100 (shown in FIG. 6 and FIG. 7) when utilized in the upstream and downstream positions respectively, the only difference being that the seal member 152 of seat assembly 100b will provide the fluid tight seal between the ring 106b and the valve body 12a of valve 10, whereas this function was performed by the O-ring 136 of ring 106 in the seat assembly 100 (shown in FIG. 5).

The seat assembly 100b is also capable of relieving excessive body pressure which may build up in the valve chamber 18 of valve 10, in a manner exactly like that previously described for seat assembly 100, in FIGS. 6 and 7.

From the foregoing it is apparent that the present invention provides a seat assembly having dual seals which will function as either an upstream or downstream seat. The seat assembly, when used in the downstream position, provides a pressure augmented primary seal means, which is exposed to pressure in the valve chamber, and a secondary seal means, which functions effectively as a compressive-type seal. The same seat assembly, when used in the upstream position, provides a pressure-augmented seal means, which is exposed to pressure in the inlet and a secondary seal means, which is effectively a compression-type seal.

The particular structure of the ring of the seat assembly is designed to compress the seal means into the appropriate positions, so that the seal means may perform the above mentioned functions, as the valve member engages the seat assemblies. The shape of the ring of the seat assembly also serves the function of protecting the seal means from being pinched when the valve member engages the seat assembly.

It may also be appreciated that the unique structure of the seat assembly permits excessive body pressure to be relieved around the seat assembly, thereby preventing costly damage which would result.

Changes may be made in the construction of parts or elements of the various embodiments as disclosed herein without departing from the spirit and scope of the invention as defined in the following claims.

I claim:

1. A valve comprising:
    a body having an inlet opening, a valve chamber, and an outlet opening therein forming a flow passageway therethrough;
    a valve member supported in the a valve chamber for opening and closing the flow passageway through the valve; and
    a seat assembly in the valve chamber around one of said openings cooperating with the adjacent walls of the valve chamber and valve member to close the flow passageway through the valve body, said seat assembly comprising:
    a ring of relatively inflexible material having a valve-seating surface formed between the inner and outer peripheries thereof;
    an inner seal means disposed in the valve-seating surface, having a portion thereof extending beyond said seating surface and exposed to the pressure in the valve chamber; and
    an outer seal means disposed in the valve-seating surface having a portion thereof extending beyond said seating surface and exposed to the pressure in the opening forming a part of the flow passageway wherein the valve-seating surface of the ring is substantially flat, having a central portion thereof relatively tangent to the valve member and the inner and outer edges of the valve-seating surface are spaced from the valve member when the central portion of the valve-seating surface engages the valve member.

2. The valve of claim 1 wherein the inner and outer seal means are disposed on opposite sides of said tangent portion.

3. The valve of claim 2 wherein the inner seal means has a diameter greater than the diameter of the outer seal member.

4. The valve of claim 1 wherein the ring includes a non-valve-member end providing an annular shoulder facing away from the valve member for engaging a wall of the valve chamber when the ring is forced away from the center of the valve chamber.

5. The valve of claim 1 wherein each of the inner and outer seal means has a generally rectangular cross section.

6. The valve of claim 1 wherein each of the inner and outer seal means has a portion having a generally rectangular cross section disposed in the valve seating surface, and a bead portion which extends beyond the valve seating surface to sealingly contact the valve member.

7. The valve of claim 1 wherein the outer periphery of the ring is sized to provide a sliding fit of the ring in the valve body.

8. The valve of claim 7 wherein the ring includes a seal member disposed in the outer periphery thereof sized to sealingly engage the valve body.

9. The valve of claim 8 wherein the seal member has a diameter larger than the diameter of the inner seal means.

10. The valve of claim 7 wherein the ring includes a seal member carried by the ring between the outer periphery and the nonvalve-member end thereof having a portion extending beyond the nonvalve-member end of the ring to sealingly engage the valve body.

11. The valve of claim 1 wherein the valve member is spherically-shaped.

12. The valve of claim 1 wherein the ring includes a flange portion extending axially from the nonvalve-member end adjacent the inner periphery of the ring.

13. The valve of claim 12 wherein the ring includes an elastomer pad bonded to the nonvalve-member end of the flange portion and sized to sealingly engage the valve body.

14. The valve of claim 1 wherein the ring includes an elastomer pad bonded to the valve member end thereof and sized to sealingly engage the valve body.

15. The valve of claim 13 wherein the elastomer pad has a diameter larger than the diameter of the outer seal means.

16. The valve of claim 1 defined further to include a second seat assembly around the other of said openings.

17. A valve seat for a ball valve, comprising:
    a ring of relatively inflexible material having a substantially flat seating surface formed between the inner and outer peripheries thereof formed at an angle such that when a central portion thereof is contacted by a valve ball, the inner and outer edges of the valve seating surface are spaced from the valve ball;
    an inner seal means disposed in the valve seating surface on one side of said central portion, having a portion thereof extending beyond said seating surface for exposure to the pressure in the chamber of a valve in which the seat is used; and an outer seal means disposed in the valve seating surface on the opposite side of said central portion from the inner seal means, having a portion thereof extending beyond said seating surface for exposure to the pressure at the inner periphery of the seat.

18. The valve seat of claim 17 wherein each of inner and outer seal means has a generally rectangular cross section.

19 The valve seat of claim 17 wherein the ring includes a seal member disposed in the outer periphery thereof.

20. The valve seat of claim 17 wherein the ring includes a flange portion extending axially from the end thereof opposite said seating surface adjacent the inner periphery of the ring, and an elastomer pad bonded to the end of the flange portion.